(12) United States Patent
Wright

(10) Patent No.: US 7,597,949 B2
(45) Date of Patent: Oct. 6, 2009

(54) SURFACE PROTECTION SYSTEM MAT

(76) Inventor: Rickie J. Wright, 7937 Charrington Dr., Canton, MI (US) 48187

( * ) Notice: Subject to any disclaimer, the term of this patent is extended or adjusted under 35 U.S.C. 154(b) by 430 days.

(21) Appl. No.: 11/451,706

(22) Filed: Jun. 13, 2006

(65) Prior Publication Data
US 2007/0286984 A1 Dec. 13, 2007

(51) Int. Cl.
B32B 3/10 (2006.01)
(52) U.S. Cl. .................. 428/116; 428/138; 428/167; 428/131; 428/68
(58) Field of Classification Search .................. None
See application file for complete search history.

(56) References Cited

U.S. PATENT DOCUMENTS

| | | | |
|---|---|---|---|
| 3,488,081 A * | 1/1970 | Nolen | 296/97.23 |
| 4,285,075 A | 8/1981 | Nelson | |
| 4,328,275 A | 5/1982 | Vargo | |
| 4,439,474 A | 3/1984 | Sagel | |
| 4,484,661 A | 11/1984 | Evenson | |
| 4,609,580 A | 9/1986 | Rockett et al. | |
| 4,798,754 A | 1/1989 | Tomek | |
| 4,822,669 A | 4/1989 | Roga | |
| 4,826,030 A | 5/1989 | Valley | |
| 5,018,235 A | 5/1991 | Stamatiou et al. | |
| 5,028,468 A | 7/1991 | Taylor | |
| 5,080,956 A | 1/1992 | Smith | |
| 5,114,774 A | 5/1992 | Maxim, Jr. | |
| 5,128,189 A | 7/1992 | Bartlett | |
| 5,270,089 A | 12/1993 | Alston et al. | |
| 5,383,570 A | 1/1995 | Gordon | |
| 5,506,040 A | 4/1996 | Cordani | |
| 5,549,945 A | 8/1996 | Lind | |
| 5,613,332 A | 3/1997 | Saylor, Jr. | |
| 5,916,658 A | 6/1999 | Mohr | |
| 6,295,658 B1 | 10/2001 | Jenkins | |
| 6,446,275 B1 | 9/2002 | Wright | |
| 6,673,409 B1 | 1/2004 | Wheatley | |
| D493,999 S | 8/2004 | Ruhl et al. | |
| D497,277 S | 10/2004 | Ruhl et al. | |

(Continued)

OTHER PUBLICATIONS

Advisory Action Before the Filing of an Appeal Brief for U.S. Appl. No. 10/436,844 dated Apr. 18, 2008 (2 pages).

(Continued)

*Primary Examiner*—Ling Xu
(74) *Attorney, Agent, or Firm*—Gifford, Krass, Sprinkle, Anderson & Citkowski, P.C.

(57) ABSTRACT

A surface protection mat, particularly for use in protecting floor surfaces from accidental liquid spills comprises a cartridge unit having an upper layer of moisture absorbing material and a lower moisture barrier, and a top layer of material impervious to liquid. The top layer includes a top side, upon which a person stands, and a bottom side, which includes a chamber for receiving the cartridge and which is set on the floor to be protected. The central portion of the top layer, in part, is formed by a honeycomb structure of specially configured hexagonal shaped cells, which cells funnel liquid downwardly from the top side to the cartridge unit. The cartridge unit is inserted into the chamber and the absorbent upper layer thereof adhered to the top layer. The mat is intended to be disposed of via routine trash collection during maintenance (usually weekly) and replaced by a fresh one.

5 Claims, 2 Drawing Sheets

U.S. PATENT DOCUMENTS

| | | |
|---|---|---|
| 6,875,494 B2 | 4/2005 | Burns et al. |
| 2006/0029773 A1 | 2/2006 | Waterman et al. |
| 2008/0280095 A1 | 11/2008 | Wright |

OTHER PUBLICATIONS

Request for Continued Examination (RCE) Transmittal and Amendment and Response Accompanying Request for Continued Examination for U.S. Appl. No. 10/436,844, filed Apr. 24, 2008 (28 pages).

Office Action for U.S. Appl. No. 10/436,844 dated Feb. 8, 2008 (10 pages).

Amendment And Response After Final for U.S. Appl. No. 10/436,844, filed Apr. 4, 2008 (22 pages).

Office Action for U.S. Appl. No. 10/436,844 dated Oct. 22, 2007 (10 pages).

Reply and Amendment to Office Action for U.S. Appl. No. 10/436,844, filed Jan. 16, 2008 (42 pages).

Office Action for U.S. Appl. No. 10/436,844 dated Aug. 16, 2007 (2 pages).

Reply and Amendment to Office Action for U.S. Appl. No. 10/436,844, filed Aug. 28, 2007 (15 pages).

Non-Final Office Action for U.S. Appl. No. 10/436,844 dated Oct. 6, 2008 (14 pages).

Office Action for U.S. Appl. No. 11/197,848 dated Oct. 22, 2007 (8 pages).

Reply and Amendment to Office Action for U.S. Appl. No. 11/197,848, filed Jan. 16, 2008 (42 pages).

U.S. Appl. No. 10/436,844, Wright.

U.S. District Court Eastern District of Michigan Case No. 03-70229 entitled *Golden Eagle USA, LLC v. Consolidated Industrial Corp., et al. Defendant Consolidated Industrial Corp.'s Rule 12(C) Motion for Judgment of Pleadings, or in the Alternative, Rule 56 Motion for Summary Judgement, on Count II -'Lanham Act Violations-Unfair Competition and False Represenation*; dated Feb. 20, 2003.

U.S. District Court Eastern District of Michigan, Case No. 03-70229 entitled *Golden Eagle USA, LLC v. Consolidated Industrial Corporation, et al. Defendant Consolidated Industrial Corp.'s Answer to Plaintiff's Amended Complaint, Affirmative Defenses, Cross-Claim and Counterclaim*, dated Mar. 5, 2003.

U.S. District Court Eastern District of Michgian Case No. 03-70229 entitled *Golden Eagle USA LLC v. Consolidated Industrial Corporation, et al.; Second Amended Complaint and Jury Demand*; dated Mar. 6, 2003.

U.S. District Court Eastern District of Michigan Case No. 03-70229 entitled *Golden Eagle USA, LLC v. Consolidated Industrial Corp., et al.; Plaintiff's Motion for Leave to Amend*; dated Mar. 24, 2003.

U.S. District Court Eastern District of Michigan Case No. 03-70229 entitled *Golden Eagle USA, LLC. v. Consolidated Industrial Corp., et al.; Defendant Rick Wright's Answer to Second Amended Complaint and Jury Demand*; dated Jun. 26, 2003.

U.S. District Court Eastern District of Michigan Case No. 03-70229 entitled *Golden Eagle USA LLC v. Consolidated Industrial Corp, et al.; Judgment* dated Aug. 25, 2003.

U.S. District Court Eastern District of Michigan Case No. 03-70229 entitled *Golden Eagle USA, LLC v. Consolidated Industrial Core. et al.; Opinion and Order*; dated Aug. 25, 2003.

\* cited by examiner

SURFACE PROTECTION SYSTEM MAT

BACKGROUND OF THE INVENTION

1. Field of the Invention

This invention relates to a surface protection mat for protecting surfaces exposed to liquids dropped thereupon and walked upon by the public, such as at entrances to buildings, high traffic areas, cafeterias and like places. More specifically, the invention relates to a multilayered surface protection mat that is inexpensive, sanitary, disposable, and intended for use in restrooms and the like and to be placed on the floor about a toilet or under a men's urinal to capture the dripping of urine during a urinating activity, thereby protecting the floor from staining as well as to prevent slip and fall accidents by persons walking on such surface.

2. Description of Related Art

Floors and countertops are subject to accidental liquid spills, and in the case of floors, potentially causing slip and fall hazards. Also, the liquid from the spills often damages the surface causing costly repairs. To preserve a dry condition, these floors and countertops require constant maintenance.

Normally, scheduled maintenance is used to monitor and clean up accidental spills. These spills occur frequently and often go unnoticed for long periods of time. Currently, excessive maintenance schedules attempt to solve the problem. However, damage to the surface still occurs between maintenance.

If a floor is exposed to a liquid spill, a danger is presented that a user will slip and fall. This is an ongoing problem in bathrooms and near urinals on tile surfaces where urine may drip when a user misses the target. As such, floor mats are extremely desirable in restrooms both for protecting users from unexpected dangers and for protecting the restroom floors from urine drippings.

Solutions to the above problems exist. For example, U.S. Pat. No. 4,285,075, issued Aug. 25, 1981 to Nelson, discloses a two-piece sanitary commode mat for protecting floors from urine. The mat includes a solid base and a hingedly attached cover formed as grille work. This cover is treated with silicone compounds to repel fluids. A replaceable pad is contained in the mat cover. The pad has an impervious plastic film base, layers of absorbent material overlaying the base, and a top previous film of non-woven material. In use, the urine falling on the grille work passes through, on and through the permeable top film of the pad, and absorbed therein. The absorbent pad may be impregnated with disinfectant and deodorizing chemicals. Maintenance is performed by opening the hinged cover, removing the pad for disposal, rinsing the base and hinged cover grille work, and installing a fresh pad.

U.S. Pat. No. 4,609,580, issued September 1988 to Rockett et al., discloses a surface mat of continuous filament, non-woven nylon to protect floors during inclement weather. The mat contained an absorbent inner layer comprised of a mixture of polymeric micro-fibers and wood pulp, and a liquid impervious film-backing layer.

U.S. Pat. No. 4,328,275, issued May 1982 to Louis M. Vargo, discloses a disposable floor mat designed to support a person(s) standing thereon and used in bathrooms, hospital operating rooms and the like for absorbing water, urine and other liquids. The mat is constructed of a sheet of liquid absorbent matting with raised portions of V-shaped or rounded cone tops coated with a repellent to direct and divert the liquid into the mat and the matting impregnated with a sanitizing agent to avoid cross-contamination. The bottom of the mat is provided with ridges to prevent contact with the contaminating liquid, and excess liquid will flow in the valleys of the mat and onto the floor surface during maintenance. The height of the mat may create a tripping hazard. When saturated, the mat is thrown out.

U.S. Pat. No. 4,822,669, issued April 1989 to Robert C. Roga, discloses a floor protection system consisting of three separate pieces combined to form a single unit. The top layer is of nonwoven fiber, with a water impervious film, laminated to the underside. In one embodiment, a layer of absorbent paper is interposed between these two materials.

U.S. Pat. No. 4,439,474, issued March 1984 to Sagel, discloses an absorbent, disposable floor mat for entranceways.

U.S. Pat. No. 5,613,332, issued March 1997 to Saylor, Jr., discloses a slip resistant floor mat intended for foot traffic across wet floor surfaces.

U.S. Pat. No. 6,295,658, issued Oct. 2, 2001 to Jenkins, discloses a floor-mat system to contain spills and includes an insert to direct liquid to an absorbent pad located at the back of the mat. This system requires a flat surface to operate effectively and thus liquid may not reach the absorbent pad. Additionally, liquids vary in viscosity and surface tension requiring more than gravity for proper flow to the absorbent pad.

Additionally, attention is directed to U.S. Pat. No. 6,446,275, issued Sep. 10, 2002 to Wright, the Applicant herein, and a surface protection mat comprised of a top layer provided with a grid of rectangular shaped openings, an intermediate layer of absorbent material, and a base layer, forming a moisture barrier. Further, Wright discloses the above noted references and other references, believed less relevant.

While the above solutions are believed suitable for the problems then addressed, there is an ongoing need for a surface protection mat that is inexpensive, disposable, captures liquids, can be stood upon by the user to protect the feet from standing in foul liquids, such as for use in catching urine droppings and catching other fluids, obviates slips and falls, and provides ease of maintenance and replacement.

SUMMARY OF THE INVENTION

In accordance with the present invention, embodiments of a surface protection mat are disclosed. According to these embodiments, each surface protection mat has multiple uses, including restrooms, residential, office applications, commercial entrances, by a vending machine, and in restrooms to catch urine about urinals and commodes wherein to ensure that the floor surface is safe to walk upon and protect the floor surface from staining. In one embodiment according to this invention, a liquid absorbing mat for placement on a surface and protecting the surface from liquid spills comprises:

a generally planar semi-rigid cartridge, said cartridge comprising, at least in part, an upper layer of fluid absorbing material, and a lower layer of fluid impervious material that resists passage of fluid, and a top layer of semi-rigid material, said top layer having a topside adapted to be stood upon to protect the foot of a user, a bottom side adhered, at least in part, to said upper layer and adapted to be placed on said surface, and an array of hexagonal shaped funnels extending through the top layer for directing liquid from the topside downwardly and onto the upper layer of said fluid absorbing material, the bottom side of said top layer and said lower layer cooperating to form a substantially continuous floor engaging surface.

The cartridge unit is interfitted into a shaped cavity provided below the topside of the top layer of moisture resistant material. When used in the restroom, and in connection with toilets and urinals for catching and captivating urine that may fall to the floor, the absorbent layer for absorbing and containing liquid (i.e. urine, etc.) is not seen or touched during maintenance.

Preferably, the top layer includes a central portion and a peripheral portion, and the array of hexagonal-shaped funnels substantially completely fill and define central portion. Each hexagonal shaped funnel comprises six sidewalls for directing fluid downwardly onto the absorbing layer, the funneling sidewalls each narrowing and sloping inwardly towards one another from the topside downwardly to the bottom side. In general, the array of hexagonal shaped funnels defines a honeycomb type structure of contiguous like shaped hexagons for funneling fluids.

The hexagonal shaped funnels are symmetrically disposed about respective geometric axes that are generally perpendicular to a plane including the top layer. The upper and lower hexagonal shaped end portions are concentrically disposed on the geometric axis of the funnel with the lower hexagonal shaped end forming a discharge opening that is smaller than the entry formed by the upper hexagonal shaped end. Preferably, the three pairs of opposed inwardly angled sidewalls of the hexagonal shaped funnel are symmetrically disposed at an angle of about 37° to 42° relative to the geometric axis of the funnel, and preferably, about 40°.

Preferably, the liquid absorbing mat presents a low profile. In this regard, the distance between the topside and the bottom side defines a predetermined thickness of the mat, and the funnel forms a throat that narrows from an inlet to an outlet opening proximate to the absorbent layer, the dimension at the outlet of the opening being substantially the same as the thickness of said mat.

To improve liquid directing, the funnel comprises a V-shaped sidewall, the sidewall having opposite sides disposed at an angle of about 40° to one another. Further, each V-shaped sidewall terminates in a rounded apex to receive and direct fluid into the downwardly narrowing funnel.

Importantly, according to an aspect of this invention, the liquid absorbing mat comprises means for resisting relative movement of the mat relative to the surface when the mat is placed thereon, the means for resisting being separate and apart from said lower layer. According to this aspect, the means for resisting relative movement comprises at least one section, and preferably a plurality of angularly separated sections, of elongated flexible ribs in side-by-side relation to one another. The rib sections are disposed on the outer peripheral section and project upwardly from the bottom side thereof.

Although many materials are contemplated, the top layer is comprised of a moisture impervious material selected from the group consisting of polypropylene, nylon, plastic, rubber, synthetic material, and cellulosic paper. Further, the moisture absorbent material of the upper layer is preferably selected from the group consisting of (a) polymer and cotton-fluff, (b) fiber and cotton-fluff, each of (a) and (b) having ten percent cotton-fluff, and (c) wood pulp. In some applications, the absorbent material includes an aroma powder that is moisture activated. A suitable material for the absorbent layer is sold under the tradename Stratex®. The moisture barrier or lower layer is comprised of a material that resists passage of fluid and has a coefficient of friction that resists movement when placed on a floor, such as typified by a TPE copmpound, consisting of styrenic block copolymer (e.g., SBS, SEBS, SEPS, or SEEPS), hydrocarbon oils, polyolefin polymer (e.g., PPH, PPC, PE), fillers (e.g., $CaCO_3$, talc, etc), heat stabilizer, color, as well as other additives (e.g., aroma additives).

In a second preferred embodiment according to this invention, a mat for protecting the floor surface of a restroom from accidental spills, including urine and water, comprises a top layer comprised of a material resistant to penetration by liquid spilled thereupon, said top layer including a top side intended to be stood upon by a user and a bottom side intended to be placed upon the floor surface, said top layer including a central portion defined by a grid of vertical walls arranged to form a geometrical array of like shaped through cells for funneling liquid between the sides of said top layer using the least material to create a lattice of cells with a given volume, the bottom side of said top layer including a shaped chamber, a cartridge unit having an outer periphery and thickness complementary to the chamber, the cartridge unit being inserted within the chamber and including an upper layer of liquid absorbing material, and a lower layer of material resistant to moisture penetration and movement relative to the restroom floor when placed thereon, and means for securing the cartridge unit into the chamber such that an upper surface of the upper layer is juxtaposed with the through cells for receiving the liquid and a lower surface of the lower layer forms a part of the bottom side of the top layer when the mat is placed on the floor.

The grid of vertical walls is arranged to form a honeycomb structure wherein the cells are hexagonal shaped with the walls of the hexagonal cells sloping downwardly and inwardly to form a funnel to direct liquid directly onto the liquid absorbent material.

Further, the means for securing includes an adhesive that secures the upper surfaces, respectively, of said upper layer to the chamber and the lower layer to the upper layer, said means for securing forming a liquid sealed system.

The materials preferred in such urinal mat are as described hereinabove.

Desirably, the mats disclosed herein are inexpensive, can be thrown out after a certain amount of use, collect liquids to maintain sanitary conditions, present a low profile when placed on the floor and the beveled outer periphery inhibits catching of the shoe of a person walking thereover, and the moisture barrier therein both inhibits leakage of fluids back onto the floor as well as deters accidental sliding movement.

The liquid absorbing mat with the honeycomb structure enables visual inspection of the absorbent mat and is easily disposed.

The liquid absorbing mat does not need to be touched during maintenance and requires no cleaning or rinsing.

The mat protects the immediate area surrounding urinals and commodes captures and absorbs unwanted drips. The honeycomb array specifically configured hexagonal shaped openings funnels drips and splashes downwardly. Desirably, users will not have to stand in urine frequently found near urinals and toilets. Also, the sanitary nature of the facility is improved because the tile is and grout is protected from urine stains and discolorations resulting from such drippings.

Desirably, the bottom side (or floor engaging surface) of the protection mat herein prevents slipping or unwanted movement of the mat. The mat cannot easily be kicked or accidentally moved out of place.

These and other features, objects and advantages of the present invention will be further understood and appreciated by those skilled in the art by reference to the following specification, claims, and appended drawings.

DETAILED DESCRIPTION OF PREFERRED EMBODIMENTS OF THE INVENTION

Figure 1:
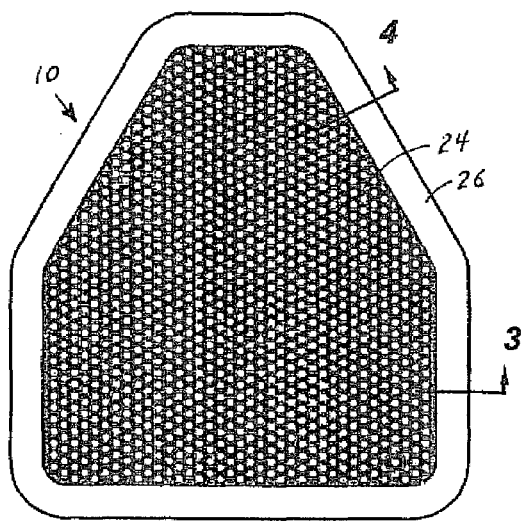
FIG. 1 is a plan view looking down at the top surface of a moisture resistant sheet provided with a central honeycomb structure for funneling liquids therefrom, the sheet forming part of a surface protection mat according to the present invention.
Figure 4:
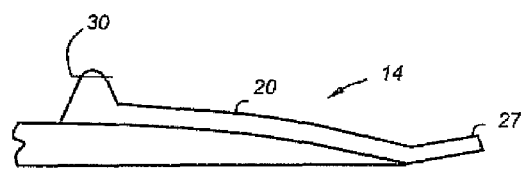
FIG. 4 is a side elevation view, in section, taken along line 4 of FIG. 1, illustrating a lift tab provided in the peripheral edge of the sheet for use in lifting the surface protection mat from the floor.
Figure 3:
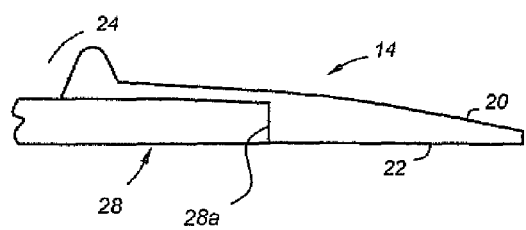
FIG. 3 is a side elevation view, in section, taken along line 3 of FIG. 1, showing detail of a peripheral edge portion of the sheet and the cavity formed in the bottom side thereof.
Figure 2:
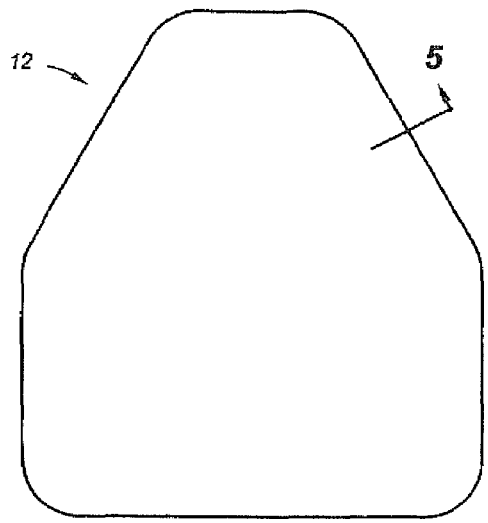
FIG. 2 is a plan view of a multilayer cartridge unit adapted to be mounted in a cavity formed in the bottom side of the moisture resistant sheet of FIG. 1, the cartridge unit forming part of the surface protection mat according to the present invention.
Figure 5:
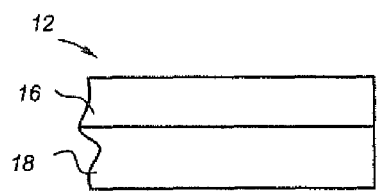
FIG. 5 is a section view, taken along line 5 of FIG. 2, showing the multilayer cartridge unit and absorbent and moisture barrier layers thereof.
Figure 6:
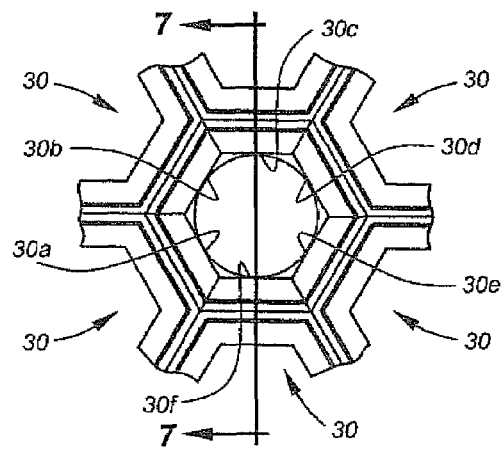
FIG. 6 is an enlarged plan view looking down at some of an array of hexagonal shaped drain funnel that extends downwardly between the top and bottom surfaces of the moisture resistant sheet of FIG. 1.
Figure 7:
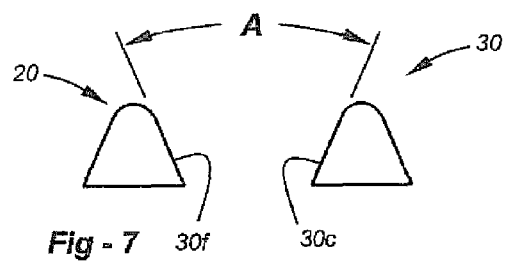
FIG. 7 is an enlarged elevation view, in section, taken along line 7-7 of FIG. 6, showing detail of a hexagonal drain funnel.
Figure 8:
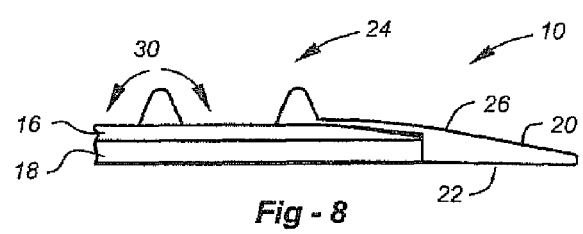
FIG. 8 is a side elevation view, in section, of cartridge unit assembled to the moisture resistant sheet to form a surface protection mat, showing the absorbent and moisture barrier layers mounted within the cavity.

A first preferred embodiment of the invention is illustrated in FIGS. 1-8 and comprises a surface protection or liquid absorbing mat, generally indicated by the reference number 10, which is adapted to placed in protective covering upon a floor to capture fluids spilled thereon. Importantly, such protection mat prevents the floor from becoming stained or otherwise attacked by fluids, and also protects persons in the area from accidentally slipping and falling.

The surface protection mat 10 may be used in many places, such as entranceways, cafeterias, and other heavily used areas where persons pass, but which surface may be had liquids spilled thereon. Also, floor areas in front of vending machines could be subject to such problems.

In particular, the surface protection mat 10 is intended to be used in restrooms and the like and to be placed on the floor surface about a toilet, commode, or under a man's wall mounted urinal to capture the dripping of urine during a urinating activity. The protection mat 10 protects the floor from staining as well persons from slips and falls occasioned by walking on such floor surface. Additionally, the mat is of sufficient thickness to not only capture undesirable drippings but also provide a slip free surface that the user may stand upon and protect the feet from such fluids.

The liquid absorbing mat 10 for placement on a surface and protecting the surface from liquid spills includes a generally planar semi-rigid cartridge 12 and a top layer 14. The cartridge 12 comprises, at least in part, an upper layer 16 of fluid absorbing material, and a lower layer 18 of fluid impervious material that resists passage of fluid and having a coefficient of friction that resists movement when placed on the floor or like receiving surface.

The top layer 14 is of semi-rigid material and includes a topside 20 adapted to be stood upon to protect the foot of a user, a bottom side 22 adhered, at least in part, to the upper layer 16 of fluid absorbing material and adapted to be placed on the floor or like receiving surface. Further, the top layer 14 includes a central portion 24 and a peripheral portion 26 that encircles the central portion.

To assist maneuvering and placement of the mat, a pair of lift tabs 27 are provide on the outer peripheral portion 26.

The bottom side 22 includes a shaped cavity 28 within which the cartridge 12 is interfitted and superposed by the central portion 24. The shaped cavity 28 includes an outer peripheral wall 28a of predetermined height and is complementary to the shape and thickness of the cartridge unit 12. A substantially continuous floor engaging surface is defined by the bottom side of the outer peripheral portion of the top layer 14 and the bottom side of the lower layer 18 when the cartridge 12 is interfitted within the cavity 28. To resist skidding and movement, the bottom side of the moisture barrier 18 may be spaced from the bottom side of the top layer 14 whereby to engage the floor surface when the support mat 10 is placed thereupon.

Importantly, the central portion 24 is substantially completely defined by a honeycomb type structure formed of a plurality of contiguous like shaped hexagonal funnels 30, the funnels being symmetrically centered on respective geometric axes that are generally perpendicular to a plane including the top layer 14. The funnels 30 extend through the top layer 14 and direct liquid from the topside 20 downwardly and onto the upper layer 16 of fluid absorbing material.

Desirably, the honeycomb structure, and associated hexagonal shaped funnels, has unexpected advantages over other shapes. The hexagon fills the space with minimal perimeter per piece area. Thus a hexagonal structure uses the least material to create a lattice of cells with a given volume.

Each hexagonal shaped funnel 30 forms hexagonal shaped upper and lower end portions and is comprised of six sidewalls 30a, 30b, 30c, 30d, 30e, and 30f for directing fluid downwardly onto the upper layer 16 of fluid absorbing material. The sidewalls 30a-30f narrow and slope inwardly towards one another from the topside downwardly to the bottom side. The end portions of the hexagonal shaped funnels 30 are concentrically disposed on the geometric axis of the funnel with the lower end portion forming a discharge opening that is smaller than the entry into the throat formed at the upper end portion.

Each hexagonal shaped funnel 30 defines three pairs of opposed inwardly angled sidewalls, such as 30a and 30d, 30b and 30e, and 30c and 30f, each pair of opposed sidewalls being symmetrically disposed at a double included angle "A" of about 37° to 42° relative to the center geometrical axis of the funnel. Stated differently, each sidewall of a hexagonal fluid passing funnel 30 of the honeycomb structure is at an angle of about 18° to 21° relative to the geometric axis of the hexagonal shape. Preferably the double included angle is about 40°.

The wall defining the narrowing sidewalls is substantially V-shaped in cross-section, defines a sidewall in each of two adjacent contiguous funnels 30, and the sidewalls of each V-shaped wall are at the above noted double included angle.

Further, each V-shaped wall terminates in a rounded apex to receive and direct fluid into the downwardly narrowing funnel.

In one aspect, the vertical distance between the topside 20 and the bottom side 22 define a predetermined thickness of the support mat 10, and the funnel 30 forms a throat of hexagonal cross-section that narrows from the entry at the topside to the outlet discharge proximate to the top surface of the upper layer 16 of absorbent layer. The lateral dimension at the outlet discharge opening is substantially the same as the vertical thickness of the support mat 10.

Figure 9:
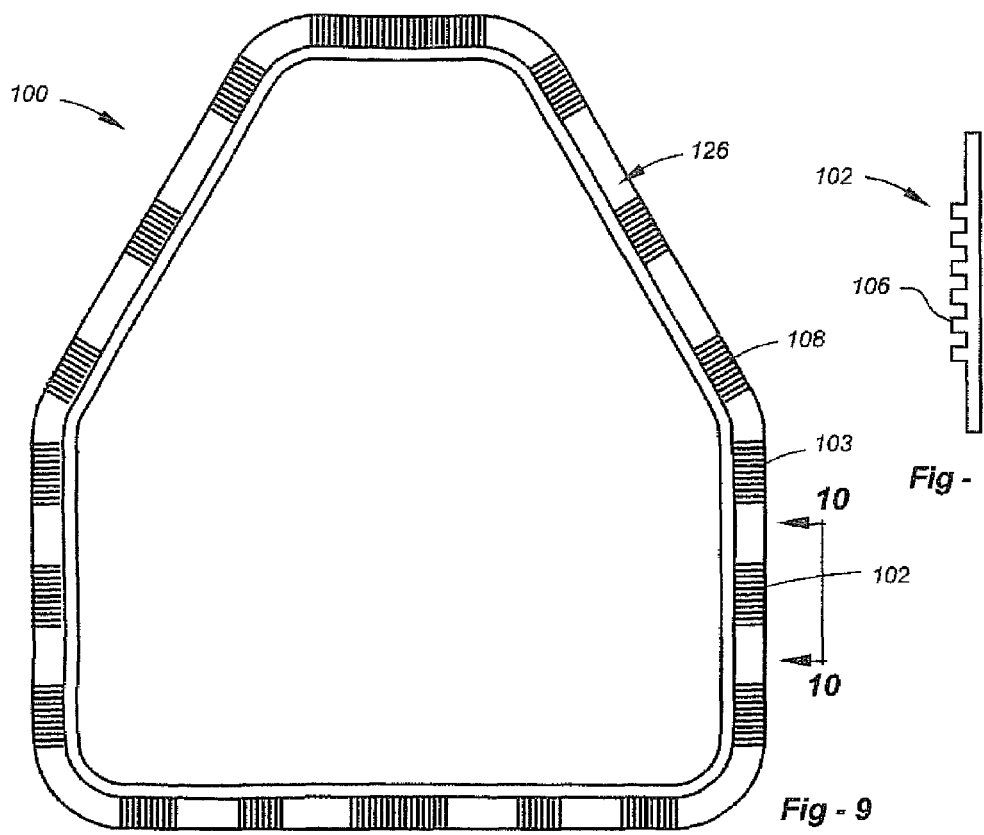
FIG. 9 is a plan view, showing the bottom side of an alternate embodiment of a moisture resistant sheet according to this invention, wherein the outer periphery thereof is provided with a plurality of sections of flexible floor engaging skid resisting ribs.
Figure 10:
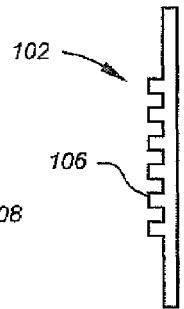
FIG. 10 is an elevation view, taken along line 10 of FIG. 9, showing a section of flexible floor engaging skid-resisting ribs.

Turning to FIGS. 9 and 10, an alternate embodiment of a support mat, is generally indicated at 100. In this support mat 100, everything is the same as described above with respect to the support mat 10, including a central section having a honeycomb structure, except that the bottom side of the outer peripheral portion 126 is provided with structure for resisting relative movement of the support mat 100 relative to the floor surface when the support mat 100 is placed thereon, the resisting structure being separate and apart from the lower layer 18 of the cartridge unit 12 into the cavity in the bottom side.

In particular, the structure for resisting movement of the support mat 100 relative to the floor comprises at least one section 102 of elongated flexible ribs 106, although a plurality of sections 102, 103, 108, etc are preferably disposed around the central portion. Shown best in FIG. 10, the ribs 106 are elongated, in side-by-side relation, and operate to engage the floor and flex slightly to resist lateral movement when a lateral force is placed on the support mat 100.

In each of the embodiments of liquid absorbing or surface protection mats 10 and 100 described hereinabove, the top layer 14 is comprised of a moisture impervious material selected from the group consisting of polypropylene, nylon, plastic, rubber, synthetic material, and cellulosic paper.

The upper layer 16 of the cartridge unit 12 is comprised of a moisture absorbent material selected from the group consisting of (a) polymer and cotton-fluff, (b) fiber and cotton-fluff, each of (a) and (b) having ten percent cotton-fluff, and (c) wood pulp.

The moisture barrier 18 forms a seal to prevent leakage of the liquid and has a coefficient of friction that resists movement when placed atop a surface. Preferably, the moisture barrier 18 is herein is comprised of a TPE compound, consisting of a styrenic block copolymer (such as SBS, SEBS, SEPS), a hydrocarbon oil, a polyolefin polymer (such as PPH, PPC, PE), fillers (such as $CaCO_3$, talc, etc.), a heat stabilizer, a color additive, and other additives (such as for odor control).

The cartridge 12 is formed as an interfittable unit in that the upper surface of the moisture barrier 18 is secured to the lower surface of the upper layer 16. Further, for final assembly of the sealed disposable product, the upper surface of the upper layer 16 is adhesively secured to the bottom side (as defined in the cavity 28) by a suitable adhesive, and the outer periphery of the cartridge 12 is secured to the cavity wall 28a by a suitable adhesive. In some applications the upper and lower layers 16 and 18 may be sonic-welded.

In general, the resulting urinal mat has an advantage over prior art designs in that the mat is soft and flexible. Additionally, the material makes for a urinal mat that is somewhat heavy. These features ensure that the mat will stay flat to the floor. Further, the urinal mat is easier to dispose of, when the useful life is over, in that the mat will bend in half.

Importantly, the top layer 14 provides an array of hexagonal shaped openings, which openings are somewhat more open than the square-shaped openings of the prior art and provide a more effective funneling action. Another advantage of this honeycomb structure in the top layer is that the absorbent core 16 therebelow is more visible to the end-user. When the absorbent core is soiled from use, such fact will be more apparent to the end-user. As a result the user will tend to replace the mat more often, leading to a cleaner more sanitary facility.

Further, the top grid layer 14 is comprised of a material (e.g., polypropylene) that is soft and more flexible (not as rigid), which feature will allow the mat to conform to the shape of the floor surface and lay flat, thereby helping to eliminate possible trip hazards. Additionally, provision of a softer more flexible material makes the urinal mat more difficult to kick out of place. Flexibility and softness of the respective mat layers makes the urinal mat more likely to bend rather than slide across the floor. Furthermore, because of the overall flexibility of the mat, it is easier to dispose of since it can easily be folded or rolled up and placed in a suitable trash receptacle.

While there many methods available, a "softer" polypropylene is made by using a gas-assisted process in the injection molding procedure.

Additionally, the top grid layer 14 has a finished tapered edge to keep it very low and flat to the floor surface. Advantageously, such feature will minimize the likelihood of slip-and-falls as well as allow for custom labeling, if desired by an end-user or customer.

The moisture barrier or bottom layer 18 serves as a moisture barrier to prevent fluids from reaching the floor surface. Importantly, the material of the moisture barrier 18 is non-slip and non-skid (i.e., has a high coefficient of friction), and does not rely on adhesive, which would leave residue on the floor. This material makes the bottom layer 18, and thus the product, much safer in that the material continually hold the urinal mat in correct position under the urinal and commode to catch urine dropping.

Accordingly, while the main focus of the mat 10 and 100 herein has been described in connection with floor protection, the invention addresses countertop and other surfaces as well.

Further, the shape of the mat may be other than that shown, depending on the use and desired application. For example, the mat can be circular, oval, trapezoidal, triangular, etc. The mat can comprise a urinal mat, a commode or the like.

I claim:

1. A liquid absorbing mat for placement on a surface and protecting the surface from liquid spills, said mat comprising:
    a generally planar cartridge, said cartridge comprising, at least in part, an upper layer of fluid absorbing material, and a lower layer of fluid impervious material that resists passage of fluid, and
    a top layer including a bottom side adhered, at least in part, to said upper layer and adapted to be placed on said surface, and an array of hexagonal shaped funnels extending through the top layer for directing liquid from the topside downwardly and onto the upper layer of said fluid absorbing material, the bottom side of said top layer including a substantially continuous floor engaging surface, wherein the mat has a thickness, each hexagonal shaped funnel forms a throat that narrows from an inlet to an outlet opening proximate to the upper layer of fluid absorbing material, each outlet opening has a lateral dimension, and the lateral dimension of each outlet opening is substantially the same as the thickness of said mat.

2. The liquid absorbing mat as claimed in claim 1, wherein each funnel is defined by at least one V-shaped sidewall, the sidewall having opposite sides disposed at an angle of about 40° to one another.

3. The liquid absorbing mat as claimed in claim 2 wherein each funnel is defined by a plurality of V-shaped sidewalls, each V shape terminating in a rounded apex to receive and direct fluid into the downwardly narrowing funnel.

4. The liquid absorbing mat as claimed in claim 1, wherein the mat is capable of being folded.

5. The liquid absorbing mat as claimed in claim 1, wherein the mat is capable of being rolled up.

\* \* \* \* \*